United States Patent
Berggren et al.

(10) Patent No.: US 10,574,490 B2
(45) Date of Patent: *Feb. 25, 2020

(54) TRANSMITTING DEVICE AND METHOD THERE

(71) Applicant: Huawei Technologies Co., Ltd., Shenzhen (CN)

(72) Inventors: Fredrik Berggren, Kista (SE); Fan Wang, Shanghai (CN); Branislav M. Popovic, Kista (SE)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 16/175,465

(22) Filed: Oct. 30, 2018

(65) Prior Publication Data

US 2019/0097849 A1    Mar. 28, 2019

Related U.S. Application Data

(63) Continuation of application No. 15/700,701, filed on Sep. 11, 2017, now Pat. No. 10,135,648, which is a continuation of application No. PCT/EP2015/055218, filed on Mar. 12, 2015.

(51) Int. Cl.
*H04L 27/00* (2006.01)
*H04L 27/26* (2006.01)
(Continued)

(52) U.S. Cl.
CPC ...... *H04L 27/0006* (2013.01); *H04L 27/2607* (2013.01); *H04L 27/2646* (2013.01);
(Continued)

(58) Field of Classification Search
CPC .................. H04L 27/0006; H04L 27/2607
See application file for complete search history.

(56) References Cited

U.S. PATENT DOCUMENTS 8,571,136 B1    10/2013    Mahmoud et al.
2010/0303166 A1*   12/2010  Piedras ............... H04L 27/2607
                                          375/267
(Continued)

FOREIGN PATENT DOCUMENTS

CN    101371542 A    2/2009
WO    2011022567 A1   2/2011

OTHER PUBLICATIONS

Thakare et al.,"An Evolved Frame Structure and the use of fractional OFDMA symbols," IEEE C80216m-08_095, pp. 1-13, Institute of Electrical and Electronics Engineers, New York, New York (Jan. 2008).
(Continued)

*Primary Examiner* — Ross Varndell
(74) *Attorney, Agent, or Firm* — Leydig, Voit & Mayer, Ltd.

(57) ABSTRACT

A transmitting device is provided. The transmitting device comprises a processor, and a transmitter; wherein the processor is configured to generate a fractional Orthogonal Frequency Division Multiplexing (OFDM) symbol based on an adjacent OFDM symbol, wherein the fractional OFDM symbol is a cyclic extension of the adjacent OFDM symbol; wherein the transmitter is configured to transmit a multicarrier signal comprising the fractional OFDM symbol and the adjacent OFDM symbol. Furthermore, the present invention also relates to a corresponding method, a multicarrier wireless communication system comprising such a transmitting device, a computer program, and a computer program product.

22 Claims, 4 Drawing Sheets

(51) Int. Cl.
  *H04W 74/08*  (2009.01)
  *H04L 5/00*  (2006.01)
  *H04L 5/14*  (2006.01)

(52) U.S. Cl.
  CPC ............ *H04L 5/001* (2013.01); *H04L 5/0044* (2013.01); *H04L 5/1469* (2013.01); *H04L 27/2602* (2013.01); *H04W 74/0808* (2013.01)

(56) References Cited

U.S. PATENT DOCUMENTS

| | | | |
|---|---|---|---|
| 2011/0096861 | A1 | 4/2011 | Green |
| 2014/0341018 | A1* | 11/2014 | Bhushan ............ H04W 28/0289 370/230 |

OTHER PUBLICATIONS

"Preamble for Licensed Assisted Access," 3GPP TSG RAN WG1 Ad-hoc Meeting, Paris, France, R1-150985, pp. 1-8, 3rd Generation Partnership Project, Valbonne, France (Mar. 24-26, 2015).

"3rd Generation Partnership Project; Technical Specification Group Radio Access Network; Evolved Universal Terrestrial Radio Access (E-UTRA); Multiplexing and channel coding(Release 12)," 3GPP TS 36.212 V12.3.0, pp. 1-89, 3rd Generation Partnership Project, Valbonne, France (Dec. 2014).

"3rd Generation Partnership Project; Technical Specification Group Radio Access Network; Evolved Universal Terrestrial Radio Access (E-UTRA); Physical channels and modulation(Release 12)," 3GPP TS 36.211 V12.4.0, pp. 1-124, 3rd Generation Partnership Project, Valbonne, France (Dec. 2014).

"Design of variable-length preamble for modified LBE and fine frequency/time," 3GPP TSG-RAN1#80, Athens, Greece, R1-150647,ETRI, pp. 1-5, 3rd Generation Partnership Project, Valbonne, France (Feb. 9-13, 2015).

"3rd Generation Partnership Project; Technical Specification Group Radio Access Network; Evolved Universal Terrestrial Radio Access (E-UTRA); Physical Channels and Modulation(Release 8)," 3GPP TS 36.211 V8.8.0, pp. 1-83, 3rd Generation Partnership Project, Valbonne, France (Sep. 2009).

"LBT Enhancements for Licensed-Assisted Access," 3GPP TSG RAN WG1 Meeting #79, R1-144701, San Francisco, 3rd Generation Partnership Project, Valbonne, France (Nov. 17-21, 2014).

* cited by examiner

200

202 Generating a fractional OFDM symbol based on an adjacent OFDM symbol, wherein the fractional OFDM symbol is a cyclic extension of the adjacent OFDM symbol 204 Transmitting a multicarrier signal comprising the fractional OFDM symbol and the adjacent OFDM symbol

TRANSMITTING DEVICE AND METHOD THERE

CROSS-REFERENCE TO RELATED APPLICATIONS

This application is a continuation of U.S. patent application Ser. No. 15/700,701, filed on Sep. 11, 2017, which is a continuation of International Application No. PCT/EP2015/055218, filed on Mar. 12, 2015. All of the afore-mentioned patent applications are hereby incorporated by reference in their entireties.

TECHNICAL FIELD

Embodiments of the present invention relate to a transmitting device. Furthermore, the present invention also relates to a corresponding method, a multicarrier wireless communication system comprising such a transmitting device, a computer program, and a computer program product.

BACKGROUND

The 3rd Generation Partnership Project (3GPP) started a Release 13 Long Term Evolution Advanced (LTE-Advanced) study item, Licensed Assisted Access (LAA), aiming to use the unlicensed spectrum, on which WiFi is currently deployed. It is observed that LTE significantly impacts WiFi performance in LTE-WiFi coexistence case, if current LTE functionalities are assumed. One major reason is that WiFi follows Listen-Before-Talk (LBT) principle, which specifies that a WiFi Node can only start transmitting after it has performed Clear Channel Assessment (CCA) and measured that the channel is idle, while a legacy LTE Node does not perform CCA and may transmit continuously. The main problem for LTE Release 13 LAA is how to achieve fair and effective coexistence with Wi-Fi, and among LAA networks deployed by different operators. To ensure fair co-existence with WiFi, LTE needs to be modified to also support LBT on the unlicensed spectrum band.

To ensure fair co-existence with WiFi, it is agreed for LAA to support LBT and discontinuous transmission as well as limited maximum transmission duration on a carrier in the unlicensed spectrum band. The LAA eNodeB can only start transmission when the channel is clear as measured by Clear Channel Assessment (CCA). After a transmission of limited maximum duration, the LAA eNodeB needs to release the channel and perform CCA again to use the channel, resulting in opportunistic transmission with maximum transmission time of around 13 ms for LBE (Load Based Equipment) and 10 ms for Frame Based Equipment (FBE).

For LBE, CCA is minimum 20 µs, extended CCA (eCCA) duration is a random factor N multiplied by the CCA time, where N is randomly selected in the range 1 ... q every time, q=4 ... 32, and Channel Occupancy Time is <=(13/32)×q ms. For FBE, CCA is minimum 20 µs and performed in the end of IDLE period, Channel Occupancy Time is 1 ms at minimum and 10 ms at maximum, IDLE period is Minimum 5% of channel occupancy time and Fixed Frame Period=Channel Occupancy Time+IDLE Period.

For LBE, the CCA may happen at any time and the CCA success may happen at any time accordingly. One option is that at least for LBE, some signal(s) can be transmitted by eNodeB between the time eNodeB is permitted to transmit and the start of data transmission, at least to reserve the channel. The starting time of the signals is immediately after CCA success and potentially does not fit into the OFDM symbol timing, resulting in a fractional OFDM symbol with variable length from zero to one complete OFDM symbol.

For FBE, the DownLink (DL) transmission can only happen at the start of the fixed frame period. Similarly, in case the starting time of the fixed frame period is not the OFDM symbol boundary, a fractional OFDM symbol to be transmitted.

Once the LAA eNodeB measures the channel as clear, after it transmits a potential fractional OFDM symbol to reserve the channel, it may transmit a preamble for time- and frequency synchronization followed by the DL data. The User Equipment (UE) gets synchronized to the LAA eNodeB based on the aperiodically transmitted preamble and is able to demodulate data immediately after the preamble. The preamble may contain a fractional OFDM symbol and at least one complete OFDM symbol, or may contain fractional OFDM symbol only, or may contain complete OFDM symbols only.

One conventional solution is to generate the fractional OFDM symbol from some pre-defined sequence, e.g. random sequence, dummy sequence or Zadoff-Chu (ZC) sequence. Specially, the LAA eNodeB generates the OFDM symbol from some pre-defined sequence, e.g. random sequence, dummy sequence or Zadoff-Chu (ZC) sequence, and then transmits the fractional OFDM symbol by using a part of the OFDM symbol such that it equals the duration of the fractional OFDM symbol.

OFDM spectral efficiency is also affected by out-of-band emission, which creates interference by the power emission of the OFDM signal. OFDM is known to have a rather slow decay of the spectral sidelobes, which necessitates the transmitter to perform one or several measures to control the out-of-band emissions, e.g., transmit filtering, windowing or pulse-shaping. These methods are used to fit the spectral content of the signal within the limits given by spectral masks, adjacent-channel-leakage ratios and similar Out-Of-Band (OOB) emission requirements. Let the transmit signal on each single subcarrier represented by s(t), the Power Spectrum Density (PSD) of s(t) can be represented by:

$$PSD(f) = A^2 T_0 \left( \frac{\sin(\pi f T_0)}{\pi f T_0} \right)^2,$$

where A denotes the signal amplitude and $T_0$ is the complete symbol duration which consists of the sum of useful symbol duration $T_U$ and guard interval $T_G$ during which the Cyclic Prefix (CP) is transmitted to overcome Inter Symbol Interference (ISI), where the CP refers to cyclically extending the symbol. It can be observed that the PSD of an OFDM subcarrier is fulfilling a sinc function which is featured by the main lobe of the largest power is of a frequency range equal to $1/T_0$, and the sidelobe is getting weaker and weaker with the frequency offset increasing and each sidelobe is also of a frequency range equal to $1/T_0$. Therefore larger $T_0$ may imply the OFDM subcarrier energy is more concentrated in its allocated frequency and less power emission.

If the modulation symbols on the different subcarriers are uncorrelated, the PSD of the OFDM signal comprising N subcarriers can be expressed as:

$$PSD(f) = \sum_{k=0}^{N-1} A^2 T_0 \left( \frac{\sin(\pi (f - f_k) T_0)}{\pi (f - f_k) T_0} \right)^2.$$

As the symbol duration of the fractional OFDM symbol $T_{0\_F}$ is shorter than the normal complete OFDM symbol duration $T_0$, the power emission may be increased where it is assumed that the bandwidth is 20 MHz, the eNodeB transmission power is 36 dBm, the FFT size is 2048, and the CP length is 144/(15000*2048) second. It can be observed that the power emission is increased if the fractional OFDM symbol duration is of ¾ useful symbol duration (¾ $T_U$), and is further increased if the fraction OFDM symbol is reduced to ½ useful symbol duration (½ $T_U$), or to ¼ useful symbol duration (¼ $T_U$).

The increased out-of-band emissions due to fractional OFDM symbols will reduce the performance of the wireless communication system. It is also non-trivial to provide means in the transmitter for controlling the spectral emissions. In a typical OFDM system, the OFDM symbols have the same (or very similar) duration. Therefore, the transmitter can implement a transmit filter based on a typical OFDM symbol duration. Such filters are typically implemented in hardware as the filter coefficients may not to be changed dynamically. However, with fractional OFDM symbols, which may have varying length depending on the CCA process, the transmit filter design would be more complicated, allowing dynamic duration OFDM symbols, which will increase the cost of the filter.

In addition, during the fractional OFDM symbol period, there would be other communication devices performing CCA measurements on the adjacent bands, e.g. LAA or WiFi devices. If there is an increase of OOB emission due to reduced symbol duration, this may introduce more severe interference to other LAA Nodes, resulting in a smaller probability of a successfully reserving the channel, further resulting in unnecessary blocking of the transmissions on the adjacent bands.

One disadvantage of conventional solutions is the additional complexity due to generation of OFDM symbol from some pre-defined sequence, e.g. random sequence, dummy sequence or Zadoff-Chu (ZC) sequence. This may either result in FFT processing and OFDM modulation process for each fractional OFDM symbol transmission, or additional resource to store the pre-generated OFDM symbols samples.

A further disadvantage of conventional solutions is that it is not possible to generate arbitrarily short OFDM symbols. For example, in the LTE eNodeB, there could be a transient period of 17 microseconds when changing from an OFF state (i.e., no transmit power) to an ON state (i.e., full transmit power).

Another disadvantage of conventional solutions is increased OOB emission due to reduced symbol duration of a fractional OFDM symbol.

SUMMARY

An objective of embodiments of the present invention is to provide a solution which mitigates or solves the drawbacks and problems of conventional solutions.

Another objective of embodiments of the present invention is to provide fractional OFDM signals which are able to reserve the channel while also supporting low-complex implementations of the fractional OFDM signal generation as well as reducing out-of-band emissions.

An "or" in this description and the corresponding claims is to be understood as a mathematical OR which covers "and" and "or", and is not to be understand as an XOR (exclusive OR).

The above objectives are solved by the subject matter of the independent claims. Further advantageous implementation forms of the present invention can be found in the dependent claims.

According to a first aspect of the invention, the above mentioned and other objectives are achieved with a transmitting device for a multicarrier wireless communication system, the transmitting device comprising:
a processor, and
a transmitter;
wherein the processor is configured to generate a fractional Orthogonal Frequency Division Multiplexing, OFDM, symbol based on an adjacent OFDM symbol, wherein the fractional OFDM symbol is a cyclic extension of the adjacent OFDM symbol;
wherein the transmitter is configured to transmit a multicarrier signal comprising the fractional OFDM symbol and the adjacent OFDM symbol.

With a transmitting device configured to transmit a multicarrier signal comprising the present fractional OFDM symbol and at least one adjacent OFDM symbol a number of advantages are provided.

An advantage is reduced implementation complexity for generating the fractional OFDM symbol due to simple re-use, or small changes, of the method used for generating the adjacent OFDM symbol.

Another advantage is reduced out-of-band power emission due to longer symbol duration.

Yet another advantage is reduced implementation complexity of the transmit filters.

Yet another advantage is larger tolerance for inter-symbol-interference for the adjacent OFDM symbol.

Yet another advantage is that the duration of the fractional OFDM symbol is not constrained by the OFF-to-ON transient time in the transmitter.

In a first possible implementation form of a transmitting device according to the first aspect, by cyclically extending the adjacent OFDM symbol, the multicarrier signal is continuous at the boundary between the fractional OFDM symbol and the adjacent OFDM symbol.

With the first possible implementation form the above stated advantages for the first aspect are applicable.

In a second possible implementation form of a transmitting device according to the first possible implementation form of the first aspect, by cyclically extending the adjacent OFDM symbol, each subcarrier waveform of the multicarrier signal is continuous at the boundary between the fractional OFDM symbol and the adjacent OFDM symbol.

With the second possible implementation form the above stated advantages for the first aspect are applicable.

In a third possible implementation form of a transmitting device according to the second possible implementation form of the first aspect, by cyclically extending the adjacent OFDM symbol, the modulation symbol of a subcarrier in the fractional OFDM symbol is the same modulation symbol as the modulation symbol of the corresponding subcarrier in the adjacent OFDM symbol.

With the third possible implementation form the above stated advantages for the first aspect are applicable.

In a fourth possible implementation form of a transmitting device according to any of the preceding possible implementation forms of the first aspect or to the first aspect as such, wherein the symbol duration of the fractional OFDM symbol is shorter than the symbol duration of the adjacent OFDM symbol.

With the fourth possible implementation form the above stated advantages for the first aspect are applicable.

In a fifth possible implementation form of a transmitting device according to any of the preceding possible implementation forms of the first aspect or to the first aspect as such, the adjacent OFDM symbol comprises one cyclic prefix.

With the fifth possible implementation form the above stated advantages for the first aspect are applicable.

In a sixth possible implementation form of a transmitting device according to any of the preceding possible implementation forms of the first aspect or to the first aspect as such, the fractional OFDM symbol is immediately followed or immediately preceded by the adjacent OFDM symbol.

With the sixth possible implementation form the above stated advantages for the first aspect are applicable.

In a seventh possible implementation form of a transmitting device according to any of the preceding possible implementation forms of the first aspect or to the first aspect as such, the fractional OFDM symbol is transmitted before an OFDM symbol used for data channels or control channels.

With the seventh possible implementation form the above stated advantages for the first aspect are applicable.

In an eighth possible implementation form of a transmitting device according to any of the preceding possible implementation forms of the first aspect or to the first aspect as such, the multicarrier signal is transmitted in unlicensed spectrum of the multicarrier wireless communication system.

With the eighth possible implementation form the above stated advantages for the first aspect are applicable.

The present invention also relates to a multicarrier wireless communication system comprising at least one transmitting device according to any of the preceding possible implementation forms of the first aspect or to the first aspect as such.

According to a second aspect of the invention, the above mentioned and other objectives are achieved with a method for a multicarrier wireless communication system, the method comprising:

generating a fractional Orthogonal Frequency Division Multiplexing (OFDM) symbol based on an adjacent OFDM symbol, wherein the fractional OFDM symbol is a cyclic extension of the adjacent OFDM symbol; and transmitting a multicarrier signal comprising the fractional OFDM symbol and the adjacent OFDM symbol.

In a first possible implementation form of a method according to the second aspect, by cyclically extending the adjacent OFDM symbol, the multicarrier signal is continuous at the boundary between the fractional OFDM symbol and the adjacent OFDM symbol.

In a second possible implementation form of a method according to the first possible implementation form of the second aspect, by cyclically extending the adjacent OFDM symbol, each subcarrier waveform of the multicarrier signal is continuous at the boundary between the fractional OFDM symbol and the adjacent OFDM symbol.

In a third possible implementation form of a method according to the second possible implementation form of the second aspect, by cyclically extending the adjacent OFDM symbol, the modulation symbol of a subcarrier in the fractional OFDM symbol is the same modulation symbol as the modulation symbol of the corresponding subcarrier in the adjacent OFDM symbol.

In a fourth possible implementation form of a method according to any of the preceding possible implementation forms of the second aspect or to the second aspect as such, wherein the symbol duration of the fractional OFDM symbol is shorter than the symbol duration of the adjacent OFDM symbol.

In a fifth possible implementation form of a method according to any of the preceding possible implementation forms of the second aspect or to the second aspect as such, the adjacent OFDM symbol comprises one cyclic prefix.

In a sixth possible implementation form of a method according to any of the preceding possible implementation forms of the second aspect or to the second aspect as such, the fractional OFDM symbol is immediately followed or immediately preceded by the adjacent OFDM symbol.

In a seventh possible implementation form of a method according to any of the preceding possible implementation forms of the second aspect or to the second aspect as such, the fractional OFDM symbol is transmitted before an OFDM symbol used for data channels or control channels.

In an eighth possible implementation form of a method according to any of the preceding possible implementation forms of the second aspect or to the second aspect as such, the multicarrier signal is transmitted in unlicensed spectrum of the multicarrier wireless communication system.

The advantages of the methods according to the second aspect are the same as those for the corresponding transmitting device according to the first aspect.

The present invention also relates to a computer program with a program code, which when runs by processing means causes said processing means to execute any method according to the present invention. Further, the invention also relates to a computer program product comprising a computer readable medium and said mentioned computer program, wherein said computer program is included in the computer readable medium, and comprises of one or more from the group: ROM (Read-Only Memory), PROM (Programmable ROM), EPROM (Erasable PROM), Flash memory, EEPROM (Electrically EPROM) and hard disk drive.

Further applications and advantages of the present invention will be apparent from the following detailed description.

BRIEF DESCRIPTION OF THE DRAWINGS

The appended drawings are intended to clarify and explain different embodiments of the present invention, in which.

DETAILED DESCRIPTION

Figures 1, 2:
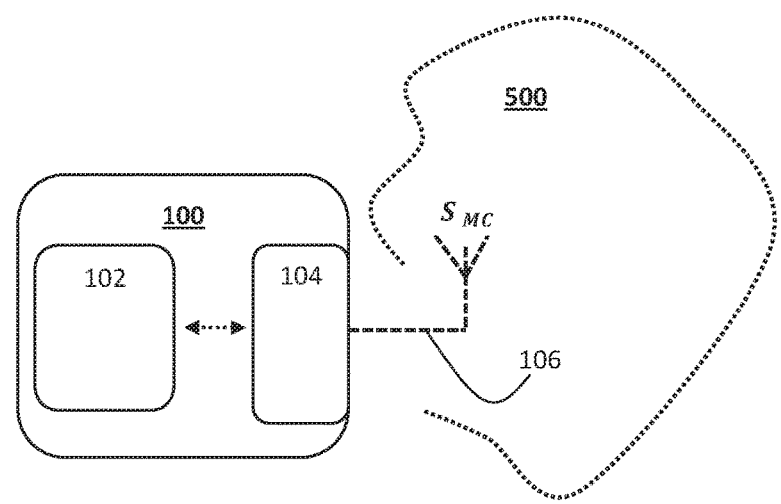
FIG. 1 shows a transmitting device according to an embodiment of the present invention.
FIG. 2 shows a method according to an embodiment of the present invention.

FIG. 1 shows a transmitting device 100 according to an embodiment of the present invention. The transmitting device 100 comprises a processor 102 and a transmitter 104 (e.g. part of a transceiver device). The processor 102 is communicably coupled with the transmitter 104 with communication means (illustrated with the dashed arrow) known in the art. The transmitter 104 is further coupled to an antenna device 106 configured for wireless communications in the multicarrier wireless communication system 500 which is illustrated with dashed lines in FIG. 1. The wireless communications may be according to suitable communication standards, such as e.g. 3GPP standards.

The processor 102 of the transmitting device 100 is configured to generate a fractional OFDM signal based on an adjacent OFDM symbol, such that the fractional OFDM symbol is a cyclic extension of the adjacent OFDM symbol. Hence, the fractional OFDM symbol is immediately followed or immediately preceded by the adjacent OFDM symbol according to an embodiment of the present invention. The generated fractional OFDM symbol is forwarded to the transmitter 104 after being generated. The transmitter 104 is configured to receive the fractional OFDM symbol from the processor 102 and further configured to transmit a multicarrier signal $S_{MC}$ comprising the fractional OFDM symbol and the adjacent OFDM symbol in the multicarrier wireless communication system 500. The multicarrier signal $S_{MC}$ is in the example in FIG. 1 transmitted via the antenna device 106 of the transmitting device 100.

The transmitting device 100 can be any suitable communication device having the capabilities and being configured to transmit multicarrier signals in a wireless communication system 500. It should is noted that the transmitting device 100 also comprises other means, units, elements, devices, etc., such that the transmitting device 100 has the mentioned capabilities. Examples of such means, units, elements, and devices are given in the following description. Further, examples of such communication devices are radio network nodes and user devices.

A radio network node, such as a base station, e.g. a Radio Base Station (RBS), which in some networks may be referred to as transmitter, "eNB", "eNodeB", "NodeB" or "B node", depending on the technology and terminology used. The radio network nodes may be of different classes such as e.g. macro eNodeB, home eNodeB or pico base station, based on transmission power and thereby also cell size. The radio network node can be a station (STA), which is any device that contains an IEEE 802.11-conformant media access control (MAC) and physical layer (PHY) interface to the wireless medium (WM).

A user device, such as a User Equipment (UE), mobile station, wireless terminal and/or mobile terminal is enabled to communicate wirelessly in a wireless communication system, sometimes also referred to as a cellular radio system. The UE may further be referred to as mobile telephones, cellular telephones, computer tablets or laptops with wireless capability. The UEs in the present context may be, for example, portable, pocket-storable, hand-held, computer-comprised, or vehicle-mounted mobile devices, enabled to communicate voice and/or data, via the radio access network, with another entity, such as another receiver or a server. The UE can be a station (STA), which is any device that contains an IEEE 802.11-conformant media access control (MAC) and physical layer (PHY) interface to the wireless medium (WM).

The disclosed solution is applicable to all coded modulation transmission systems sending information to multiple users, possibly combined with OFDM and Multiple Input Multiple Output (MIMO) transmissions. For example, 3GPP LAA systems can take advantage of the present solution. Therefore, according to an embodiment of the present invention the multicarrier signal $S_{MC}$ is transmitted in unlicensed spectrum of the multicarrier wireless communication system 500.

FIG. 2 shows a general flow chart of a method 200 according to an embodiment of the present invention. The method 200 may be executed in a transmitting device 200, such as the one shown in FIG. 1. The method 200 comprises the first step of generating 202 a fractional OFDM symbol based on an adjacent OFDM symbol. The fractional OFDM symbol is, as described above, a cyclic extension of the adjacent OFDM symbol. The method 200 further comprises the second step of transmitting 204 a multicarrier signal $S_{MC}$ comprising the fractional OFDM symbol and the adjacent OFDM symbol.

The generated fractional OFDM symbol has no fixed duration and may be adjacent with an OFDM symbol containing preamble, or an OFDM symbol containing data and/or control information according to embodiments of the present invention.

The length of the fractional OFDM symbol is not fixed and may change for each time the transmitting device 100 (such as a LAA eNodeB) transmits the multicarrier signal $S_{MC}$. This is because the transmitting device 100 may start transmission once it measures the channel as clear and it can be at any time during a subframe.

Embodiments of the present invention disclose to generate the fractional OFDM symbol from the adjacent OFDM symbol in a way comprising at least one of the following: the fractional OFDM symbol is a cyclic extension of the subsequent OFDM symbol; or the fractional OFDM symbol is a cyclic extension of the previous OFDM symbol.

A cyclic extension implies that the signal is continuous between the fractional OFDM symbol and the subsequent/previous OFDM symbol. One way of cyclic extension is to assure that each subcarrier waveform is continuous between the fractional OFDM symbol and the subsequent/previous OFDM symbol, which can be achieved by, for each subcarrier, use the same modulation symbol in the fractional OFDM symbol and the subsequent/previous OFDM symbol.

Therefore, embodiments of the present invention consider two consecutive OFDM symbols, i.e. the fractional OFDM symbol and the adjacent OFDM symbol. The adjacent OFDM symbol could be an OFDM symbol containing preamble, or an OFDM symbol containing data and/or control information.

The adjacent OFDM symbol could comprise a cyclic prefix. Moreover, typically an OFDM symbol has a duration of its useful part, $T_U$, such that each subcarrier produces an integer number of periods during $T_U$, where the number of periods depend on the subcarrier frequency. Embodiments of the present invention is applicable to where the duration of the useful part of the adjacent OFDM symbol is such that each subcarrier produces an integer number of periods during the useful period. A skilled person in the art will also be able to apply the present solution by performing a cyclic extension for cases where the duration of the useful part of the adjacent OFDM symbol is such that each subcarrier does not produce an integer number of periods during the useful period.

In the following description LTE terminology and systems are considered for exemplifying embodiments of the present invention. It should however be noted that the present solutions is not limited hereto.

In the LTE system, the time-continuous signal $s_l^{(p)}(t)$ on antenna port p in OFDM symbol l in a downlink slot is defined by $$s_l^{(p)}(t) = \sum_{k=-\lfloor N_{RB}^{DL} N_{sc}^{RB}/2 \rfloor}^{-1} a_{k^{(-)},l}^{(p)} \cdot e^{j2\pi k \Delta f(t-N_{CP,l}T_s)} + \sum_{k=1}^{\lfloor N_{RB}^{DL} N_{sc}^{RB}/2 \rfloor} a_{k^{(+)},l}^{(p)} \cdot e^{j2\pi k \Delta f(t-N_{CP,l}T_s)}$$

for $0 \leq t < (N_{CP,l}+N) \times T_s$ where $k^{(-)}=k+\lfloor N_{RB}^{DL} N_{sc}^{RB}/2 \rfloor$ and $k^{(+)}=k+\lfloor N_{RB}^{DL} N_{sc}^{RB}/2 \rfloor-1$, resource element (k,l) on antenna port p corresponds to the complex value $a_{k,l}^{(p)}$, $T=1/(15000*2048)$ second $N_{sc}^{RB}=12$ and $N_{RB}^{DL}$ is related to the system bandwidth, e.g. it assumes the value 100 for 20 MHz bandwidth.

The variable N equals 2048 for $\Delta f=15$ kHz subcarrier spacing and 4096 for $\Delta f=7.5$ kHz subcarrier spacing. The OFDM symbols in a slot shall be transmitted in increasing order of l, starting with l=0, where OFDM symbol l>0 starts at time $\sum_{l'=0}^{l-1}(N_{CP,l'}+N)T_s$ within the slot. The value of $N_{CP,l}$ is given in Table 1 below for LTE.

TABLE 1

OFDM signal parameters in LTE

| Configuration | | Cyclic prefix length $N_{CP,l}$ |
|---|---|---|
| Normal cyclic prefix | $\Delta f = 15$ kHz | 160 for l = 0 |
| | | 144 for l = 1, 2, . . . , 6 |
| Extended cyclic prefix | $\Delta f = 15$ kHz | 512 for l = 0, 1, . . . , 5 |
| | $\Delta f = 7.5$ kHz | 1024 for l = 0, 1, 2 |

In embodiments of the present invention, the fractional OFDM symbol l' followed by the OFDM symbol l can be generated as $$s_{l'}^{(p)}(t) = \sum_{k=-\lfloor N_{RB}^{DL} N_{sc}^{RB}/2 \rfloor}^{-1} a_{k^{(-)},l}^{(p)} \cdot e^{j2\pi k \Delta f(t-N_{CP,l}T_s-T_{0\_F})} + \sum_{k=1}^{\lfloor N_{RB}^{DL} N_{sc}^{RB}/2 \rfloor} a_{k^{(+)},l}^{(p)} \cdot e^{j2\pi k \Delta f(t-N_{CP,l}T_s-T_{0\_F})}$$

for $0 \leq t \leq T_{0\_F}$. It can be observed each subcarrier waveform is continuous between the fractional OFDM symbol l' and the subsequent OFDM symbol l because $$\lim_{t \to T_{0\_F}} s_{k,l'}^{(p)}(t) = a_{k,l}^{(p)} \cdot e^{j2\pi k \Delta f(t-N_{CP,l}T_s)} = s_{k,l}^{(p)}(0),$$

where k is the subcarrier index.

In addition, the signal between the fractional OFDM symbol l' and the subsequent OFDM symbol l is also continuous because $$\lim_{t \to T_{0\_F}} s_{l'}^{(p)}(t) = \sum_{k=-\lfloor N_{RB}^{DL} N_{sc}^{RB}/2 \rfloor}^{-1} a_{k^{(-)},l}^{(p)} \cdot e^{j2\pi k \Delta f(-N_{CP,l}T_s)} + \sum_{k=1}^{\lfloor N_{RB}^{DL} N_{sc}^{RB}/2 \rfloor} a_{k^{(+)},l}^{(p)} \cdot e^{j2\pi k \Delta f(-N_{CP,l}T_s)} = s_l^{(p)}(0).$$

In this way the fractional OFDM symbol l' is a cyclic extension of the subsequent OFDM symbol, where the following condition is fulfilled $$s_{l'}^{(p)}(t)=s_l^{(p)}(NT_s-T_{0\_F}+t).$$

Without loss of generality, the cyclic extension of the subsequent OFDM symbol can also be expressed by $$F^{(p)}(t)=S^{(p)}(T_u-T_{0\_F}+t) \text{ or } F^{(p)}(t)=S^{(p)}((T_u-T_{0\_F}+t) \text{mod} (T_u+T_G)),$$

where $F^{(p)}(t)$ is the fractional OFDM symbol on antenna port p in the time domain with symbol duration $T_{0\_F}$; mod is modulo operation; and $S^{(p)}(t)$ is the subsequent OFDM symbol on antenna port p with a positive information symbol duration $T_u$ and a non-negative cyclic prefix duration $T_{CP}$.

Figure 3:
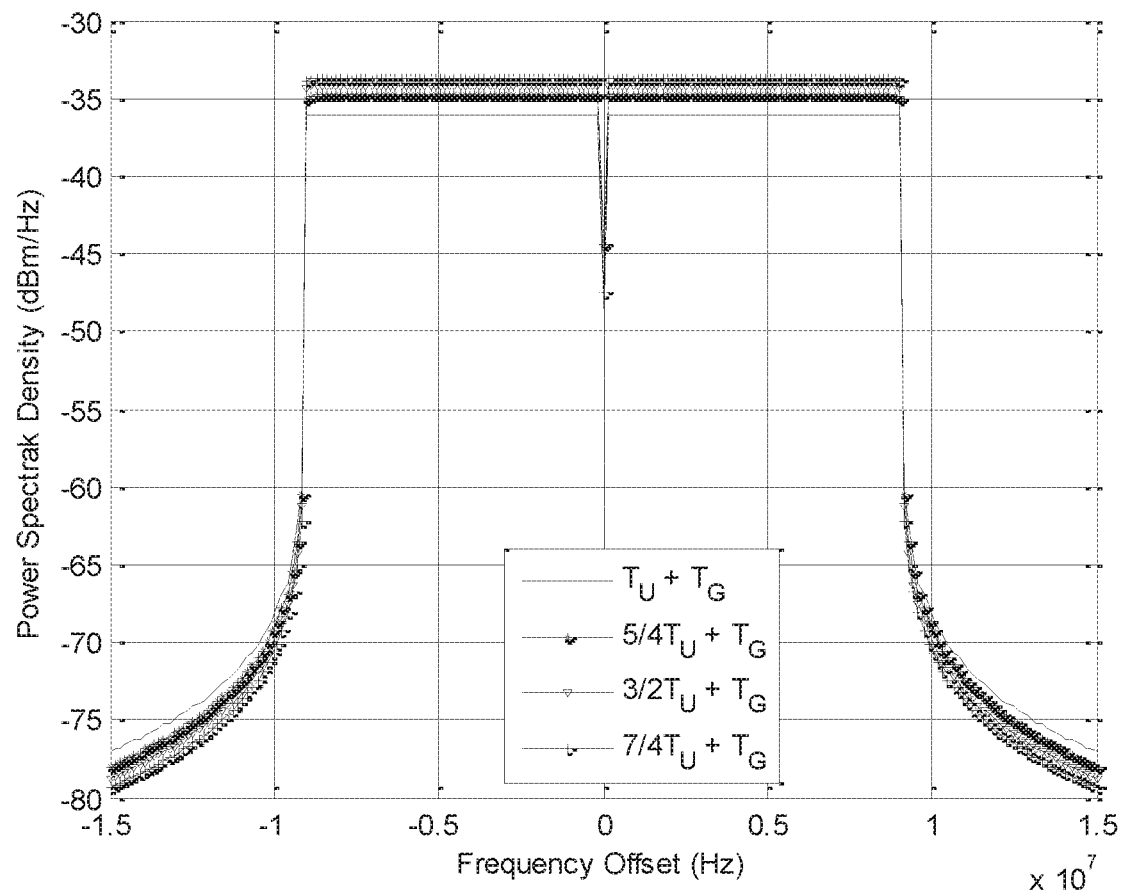
FIG. 3 shows the PSD for OFDM symbols of different duration showing that the OOB emissions decrease for fractional OFDM symbols being generated as cyclic extensions of a subsequent OFDM symbol.

By generating the fractional OFDM symbol as a cyclic extension of the subsequent OFDM symbol, the OFDM symbol duration is prolonged compared with the concerned fractional OFDM symbol, and also the subsequent OFDM symbol, resulting in reduced power emission, as shown in FIG. 3 where the x-axis shows the frequency offset and the y-axis shows the PSD.

In one other embodiment of the present invention, the fractional OFDM symbol is generated from the previous OFDM symbol. The fractional OFDM symbol l' following the OFDM symbol l can be generated as:

$$s_{l'}^{(p)}(t) = \sum_{k=-\lfloor N_{RB}^{DL} N_{sc}^{RB}/2 \rfloor}^{-1} a_{k^{(-)},l}^{(p)} \cdot e^{j2\pi k \Delta f t} + \sum_{k=1}^{\lfloor N_{RB}^{DL} N_{sc}^{RB}/2 \rfloor} a_{k^{(+)},l}^{(p)} \cdot e^{j2\pi k \Delta f t}$$

for $0 \leq t < T_{0\_F}$. It can be observed each subcarrier waveform is continuous between the fractional OFDM symbol l' and the previous OFDM symbol l because $$s_{k,l'}^{(p)}(0) = a_{k,l}^{(p)} = \lim_{t \to (N_{CP,l}+N) \times T_s} s_{k,l}^{(p)}(t),$$

where k is the subcarrier index.

In addition, the signal between the fractional OFDM symbol l' and the previous OFDM symbol l is also continuous because $$\lim_{t \to (N_{CP,l}+N) \times T_s} s_l^{(p)}(t) = \sum_{k=-\lfloor N_{RB}^{DL} N_{sc}^{RB}/2 \rfloor}^{-1} a_{k^{(-)},l}^{(p)} + \sum_{k=1}^{\lfloor N_{RB}^{DL} N_{sc}^{RB}/2 \rfloor} a_{k^{(+)},l}^{(p)} = s_{l'}^{(p)}(0).$$

In this way the fractional OFDM symbol l' is a cyclic extension of the previous OFDM symbol, where the subcarrier spacing concerning the fractional OFDM symbol is the same as the subcarrier spacing concerning the previous OFDM symbol, and the following condition is fulfilled $$s_{l'}^{(p)}(t)=s_l^{(p)}(N_{CP,l}T_s+t).$$

Without loss of generality, the cyclic extension of the previous OFDM symbol can also be expressed by $$F^p(t)=S^{(p)}((T_{CP}+t) \bmod (T_u+T_{CP})),$$

where $F^p(t)$ is the fractional OFDM symbol on antenna port p in the time domain; mod is the modulo operation; and $S^{(p)}(t)$ is the previous OFDM symbol on antenna port p with a positive information symbol duration $T_u$ and a non-negative cyclic prefix duration $T_{CP}$.

In another example of the present invention, the adjacent OFDM symbol is an OFDM symbol with at least one subcarrier not having an integer number of periods. The time-continuous signal $s_l^{(p)}(t)$ on antenna port p in the adjacent OFDM symbol l in a downlink slot is defined by $$s_l^{(p)}(t) = \sum_{k=-\lfloor N_{RB}^{DL} N_{sc}^{RB}/2 \rfloor}^{-1} a_{k(-),l}^{(p)} \cdot e^{j2\pi k \Delta f(t-N_{CP,l}T_s)} +$$

$$\sum_{k=1}^{\lceil N_{RB}^{DL} N_{sc}^{RB}/2 \rceil} a_{k(+),l}^{(p)} \cdot e^{j2\pi k \Delta f(t-N_{CP,l}T_s)}$$

for $T_{start} \leq t < T_{end}$, where $T_{end}-T_{start} < NT_s$. Subcarrier k has a period of $1/(k\Delta f)$ and since $NT_s=1/\Delta f$, then there is an integer number of periods within the duration of $NT_s$. Therefore if $T_{end}-T_{start} < NT_s$ then there is at least one subcarrier not having an integer number of periods.

Figure 4:
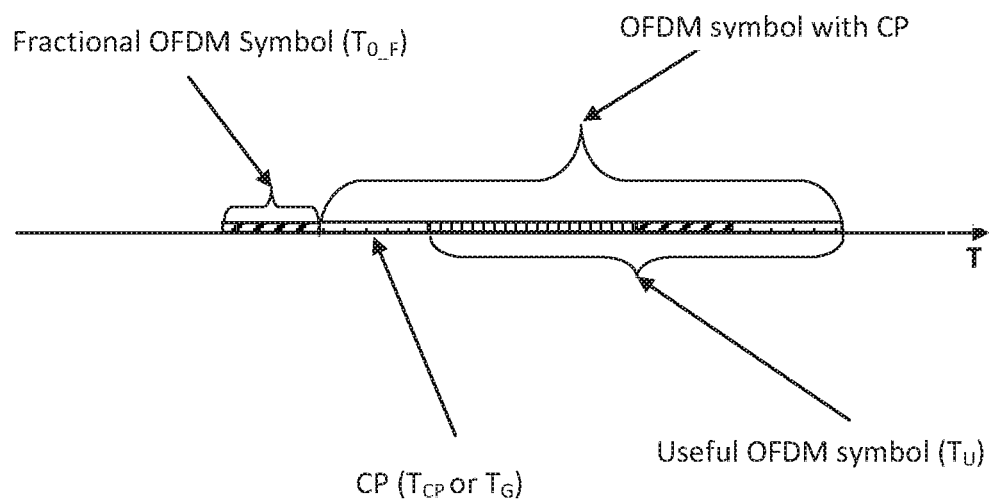
FIG. 4 illustrates the generation of the fractional OFDM symbol in a way that the fractional OFDM symbol is a cyclic extension of the subsequent OFDM symbol.

In one embodiment of the present invention, the fractional OFDM symbol is generated from the following/subsequent OFDM symbol in a way that the fractional OFDM symbol is the cyclic extension of the subsequent OFDM symbol. One example assuming the subsequent OFDM symbol is an OFDM symbol containing CP and useful OFDM symbol is illustrated in FIG. 4. It should be noted that the x-axis in FIGS. 4-6 represent time T.

As shown in FIG. 4 the fractional OFDM symbol with duration $T_{O\_F}$ is a cyclic extension of the subsequent OFDM symbol. The subsequent OFDM symbol is in this particular example an OFDM symbol comprising CP with duration $T_G$ and useful information with duration $T_U$.

Figure 5:
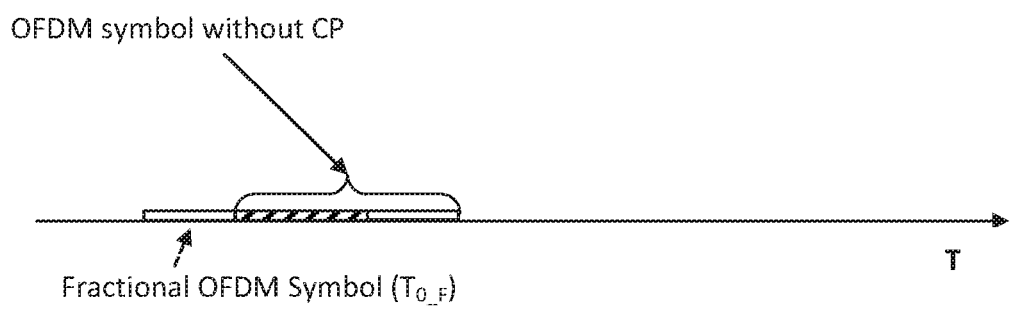
FIG. 5 illustrates the generation of the fractional OFDM symbol in a way that the fractional OFDM symbol is a cyclic extension of the subsequent OFDM symbol.
Figure 6:
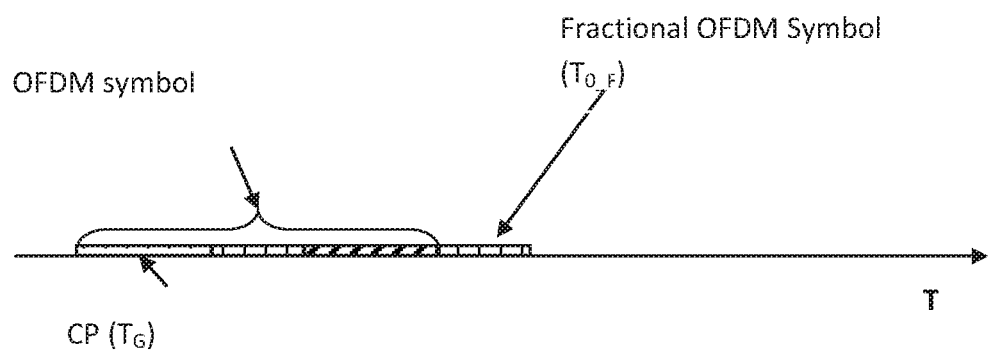
FIG. 6 illustrates the generation of the fractional OFDM symbol in a way that the fractional OFDM symbol is a cyclic extension of the previous OFDM symbol.

In another embodiment of the present invention, the subsequent OFDM symbol is an OFDM symbol without CP as illustrated in FIG. 5. This may be used for many purposes, e.g. for purpose of reducing the overhead. In FIG. 5 the fractional OFDM symbol with duration $T_{O\_F}$ is a cyclic extension of the subsequent OFDM symbol without CP. Generating the fractional OFDM symbol as a cyclic extension of the subsequent OFDM symbol still provides the advantages of simple implementation and prolonged symbol duration to reduce out-of-band power emissions.

In a further embodiment of the present invention, the fractional OFDM symbol is generated from the subsequent OFDM symbol in a way that the multicarrier signal $S_{MC}$ is continuous at the boundary between the fractional OFDM symbol and the subsequent OFDM symbol. One example of generating continuous symbols is by means of N-continuous OFDM.

In further embodiments of the present invention, the fractional OFDM symbol is generated from the previous OFDM symbol in a way that the fractional OFDM symbol is a cyclic extension of the previous OFDM symbol.

In one example the fractional OFDM symbol with duration $T_{O\_F}$ starts not at the OFDM symbol boundary and could be used to at least reserve the channel until the downlink transmission carrying other useful information happens, e.g. downlink transmission for control information or data. The fractional OFDM symbol starts immediately after the previous OFDM symbol and ends at the OFDM subframe boundary. In this case the fractional OFDM symbol is a cyclic extension of the previous OFDM symbol. The previous OFDM symbol may start immediately when the transmitting device 100 measures the channel as clear.

In a further embodiment of the present invention, the fractional OFDM symbol is generated from the subsequent/previous OFDM symbol by means of manipulation of the subsequent/previous OFDM symbol. The manipulation includes but is not limited to manipulations, such as multiplication of the subsequent OFDM symbol by a real or complex value, the shifts or cyclic shifts of the subsequent OFDM symbol, truncation, puncturing, using different parameters defining the subsequent OFDM symbol (e.g., root indices, initialization values of shift registers, etc.), other linear transformations and any other means using the subsequent OFDM symbol.

Figure 7:
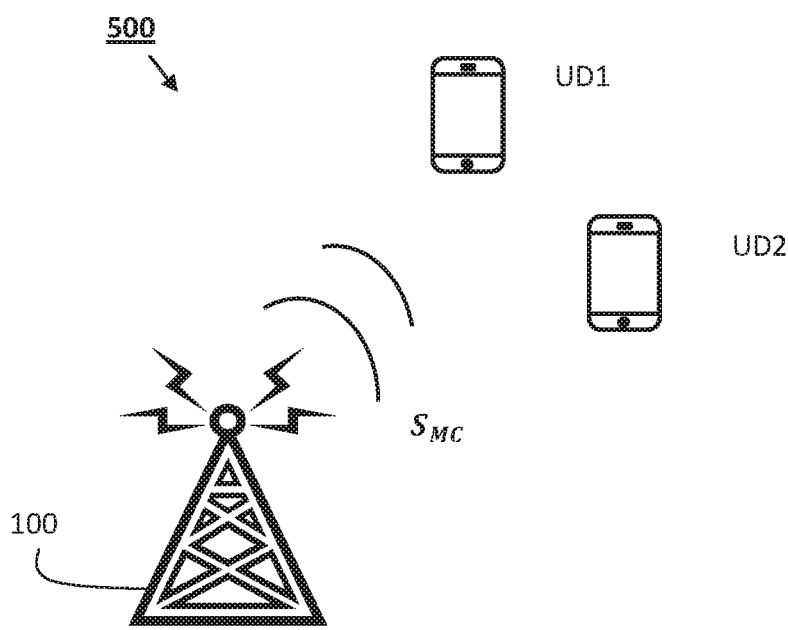
FIG. 7 illustrates a multicarrier wireless communication system according to an embodiment of the present invention.

FIG. 7 illustrates a multicarrier wireless communication system 500 according to an embodiment of the present invention. The transmitting device 100 is in this example a LAA eNodeB configured to transmit downlink signals in a cellular multicarrier communication system. In FIG. 7 also two exemplary User Devices (UDs) UD1 and UD2 are shown. The UDs may be any mobile station or corresponding devices known in the art, such as UEs. The transmitting device 100 transmits one or more multicarrier signals $S_{MC}$ in the downlink. UD1 and UD2 are configured to receive the multicarrier signal(s) $S_{MC}$ from the transmitting device 100. UD1 and UD2 get synchronized to the LAA eNodeB based on the aperiodically transmitted preamble and are able to demodulate data immediately after the preamble. The preamble may contain a fractional OFDM symbol and at least one complete OFDM symbol, or may contain fractional OFDM symbol only, or may contain complete OFDM symbols only.

Furthermore, any method according to the present invention may be implemented in a computer program, having a program code, which when runs by processing means causes the processing means to execute the steps of the method. The computer program is included in a computer readable medium of a computer program product. The computer readable medium may comprises of essentially any memory, such as a ROM (Read-Only Memory), a PROM (Programmable Read-Only Memory), an EPROM (Erasable PROM), a Flash memory, an EEPROM (Electrically Erasable PROM), or a hard disk drive.

Moreover, it is realized by the skilled person that the present transmitting device 100 comprises the necessary communication capabilities in the form of e.g., functions, means, units, elements, etc., for performing the present solution. Examples of other such means, units, elements and functions are: processors, memory, buffers, control logic, encoders, decoders, rate matchers, de-rate matchers, mapping units, multipliers, decision units, selecting units, switches, interleavers, de-interleavers, modulators, demodulators, inputs, outputs, antennas, amplifiers, receiver units, transmitter units, DSPs, MSDs, TCM encoder, TCM decoder, power supply units, power feeders, communication interfaces, communication protocols, etc. which are suitably arranged together for performing the present solution.

Especially, the processors of the present devices may comprise, e.g., one or more instances of a Central Processing Unit (CPU), a processing unit, a processing circuit, a processor, processing mean, an Application Specific Integrated Circuit (ASIC), a microprocessor, or other processing logic that may interpret and execute instructions. The expression "processor" may thus represent a processing circuitry comprising a plurality of processing circuits, such as, e.g., any, some or all of the ones mentioned above. The processing circuitry may further perform data processing functions for inputting, outputting, and processing of data comprising data buffering and device control functions, such as call processing control, user interface control, or the like.

Finally, it should be understood that the present invention is not limited to the embodiments described above, but also relates to and incorporates all embodiments within the scope of the appended independent claims.

The invention claimed is:

1. A transmitting device for a wireless communication system, the transmitting device comprising:
 a processor configured to generate a fractional orthogonal frequency division multiplexing (OFDM) symbol based on an adjacent OFDM symbol, wherein the fractional OFDM symbol is a cyclic extension of the adjacent OFDM symbol such that a modulation symbol of a subcarrier in the fractional OFDM symbol is the same modulation symbol as a modulation symbol of a subcarrier in the adjacent OFDM symbol associated with the subcarrier in the fractional OFDM symbol; and
 a transmitter configured to cooperate with the processor to transmit a signal comprising the fractional OFDM symbol and the adjacent OFDM symbol once the transmitter device measures the channel as clear.

2. The transmitting device according to claim 1, wherein, by cyclically extending the adjacent OFDM symbol, the signal is continuous at the boundary between the fractional OFDM symbol and the adjacent OFDM symbol.

3. The transmitting device according to claim 2, wherein, by cyclically extending the adjacent OFDM symbol, each subcarrier waveform of the signal is continuous at the boundary between the fractional OFDM symbol and the adjacent OFDM symbol.

4. The transmitting device according to claim 1, wherein a symbol duration of the fractional OFDM symbol is shorter than a symbol duration of the adjacent OFDM symbol.

5. The transmitting device according to claim 1, wherein the adjacent OFDM symbol comprises one cyclic prefix.

6. The transmitting device according to claim 1, wherein the fractional OFDM symbol is immediately followed or immediately preceded by the adjacent OFDM symbol.

7. The transmitting device according to claim 1, wherein the transmitter is configured to cooperate with the processor to transmit the fractional OFDM symbol before an OFDM symbol which is used for data channels or control channels.

8. The transmitting device according to claim 1, wherein the transmitter is configured to cooperate with the processor to transmit the signal in an unlicensed spectrum of the wireless communication system.

9. A method for a wireless communication system, the method comprising:
 generating, by a transmitting device, a fractional orthogonal frequency division multiplexing (OFDM) symbol based on an adjacent OFDM symbol, wherein the fractional OFDM symbol is a cyclic extension of the adjacent OFDM symbol such that a modulation symbol of a subcarrier in the fractional OFDM symbol is the same modulation symbol as a modulation symbol of a subcarrier in the adjacent OFDM symbol associated with the subcarrier in the fractional OFDM symbol; and
 transmitting, by the transmitting device, a signal comprising the fractional OFDM symbol and the adjacent OFDM symbol once the transmitting device measures the channel as clear.

10. The method according to claim 9, wherein, by cyclically extending the adjacent OFDM symbol, the signal is continuous at the boundary between the fractional OFDM symbol and the adjacent OFDM symbol.

11. The method according to claim 10, wherein, by cyclically extending the adjacent OFDM symbol, each subcarrier waveform of the signal is continuous at the boundary between the fractional OFDM symbol and the adjacent OFDM symbol.

12. The method according to claim 9, wherein a symbol duration of the fractional OFDM symbol is shorter than a symbol duration of the adjacent OFDM symbol.

13. The method according to claim 9, wherein the adjacent OFDM symbol comprises one cyclic prefix.

14. The method according to claim 9, wherein the fractional OFDM symbol is immediately followed or immediately preceded by the adjacent OFDM symbol.

15. The method according to claim 9, wherein the fractional OFDM symbol is transmitted before an OFDM symbol which is used for data channels or control channels.

16. The method according to claim 9, wherein the signal is transmitted in an unlicensed spectrum of the wireless communication system.

17. A non-transitory computer-readable memory having processor-executable instructions stored thereon for a wireless communication system, the processor-executable instructions, when executed, facilitating performance of the following:
 generating a fractional orthogonal frequency division multiplexing (OFDM) symbol based on an adjacent OFDM symbol, wherein the fractional OFDM symbol is a cyclic extension of the adjacent OFDM symbol such that a modulation symbol of a subcarrier in the fractional OFDM symbol is the same modulation symbol as a modulation symbol of a subcarrier in the adjacent OFDM symbol associated with the subcarrier in the fractional OFDM symbol; and
 transmitting a signal comprising the fractional OFDM symbol and the adjacent OFDM symbol once the channel is measured as clear.

18. The non-transitory computer-readable memory method according to claim 17, wherein a symbol duration of the fractional OFDM symbol is shorter than a symbol duration of the adjacent OFDM symbol.

19. The non-transitory computer-readable memory according to claim 17, wherein the adjacent OFDM symbol comprises one cyclic prefix.

20. The non-transitory computer-readable memory according to claim 17, wherein the fractional OFDM symbol is immediately followed or immediately preceded by the adjacent OFDM symbol.

21. The non-transitory computer-readable memory according to claim 17, wherein the fractional OFDM symbol is transmitted before an OFDM symbol which is used for data channels or control channels.

22. The non-transitory computer-readable memory according to claim 17, wherein the signal is transmitted in an unlicensed spectrum of the wireless communication system.

* * * * *